United States Patent
Sharma et al.

(10) Patent No.: US 11,675,967 B2
(45) Date of Patent: Jun. 13, 2023

(54) AUTOMATED FRONT-END CODE GENERATING METHOD AND SYSTEM FOR A WEBSITE

(71) Applicant: Accenture Global Solutions Limited, Dublin (IE)

(72) Inventors: Manish Sharma, Gurugram (IN); Saurabh Gupta, Gurgaon (IN); Alok Gupta, Meerut (IN); Tarandeep Singh Chandhok, New Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 175 days.

(21) Appl. No.: 16/557,335

(22) Filed: Aug. 30, 2019

(65) Prior Publication Data
US 2021/0064693 A1   Mar. 4, 2021

(51) Int. Cl.
| G06F 40/14 | (2020.01) |
| G06F 16/958 | (2019.01) |
| G06F 8/35 | (2018.01) |

(52) U.S. Cl.
CPC ........... *G06F 40/14* (2020.01); *G06F 8/35* (2013.01); *G06F 16/958* (2019.01); *G06F 16/986* (2019.01)

(58) Field of Classification Search
CPC ... G06F 40/14; G06F 8/35; G06F 8/38; G06F 16/958; G06F 16/986
See application file for complete search history.

(56) References Cited

U.S. PATENT DOCUMENTS

| 2007/0005323 | A1* | 1/2007 | Patzer | G01R 31/318364 703/14 |
| 2009/0031213 | A1* | 1/2009 | Goldenberg | G06T 11/001 715/235 |
| 2012/0110019 | A1* | 5/2012 | Nielsen | G06Q 10/10 707/781 |
| 2014/0310591 | A1* | 10/2014 | Nguyen | G06F 40/166 715/234 |
| 2015/0339268 | A1* | 11/2015 | Bednarz, Jr. | G06F 40/14 715/248 |
| 2016/0048605 | A1* | 2/2016 | Baldwin | G06F 40/106 715/235 |
| 2016/0314099 | A1* | 10/2016 | Lin | G06F 40/103 |
| 2017/0024363 | A1* | 1/2017 | Tocchini | G06N 7/005 |
| 2017/0090734 | A1* | 3/2017 | Fitzpatrick | G06F 40/137 |
| 2018/0052808 | A1* | 2/2018 | Wan | G06F 16/9577 |
| 2018/0059919 | A1* | 3/2018 | Wan | G06F 3/04845 |
| 2019/0034976 | A1* | 1/2019 | Hamedi | G06Q 30/0204 |
| 2019/0250891 | A1* | 8/2019 | Kumar | G06N 3/0454 |

* cited by examiner

*Primary Examiner* — Asher D Kells
(74) *Attorney, Agent, or Firm* — Plumsea Law Group, LLC

(57) ABSTRACT

A method and system for generating automated front-end code for a website from design files is described. In one embodiment, a method for generating automated front-end code for a website includes obtaining at least one design file associated with a design of a website from a client device. Hypertext markup language (HTML) code and a cascading style sheet (CSS) file is automatically generated from the at least one design file from information obtained from a plurality of layers associated with the design file. The method includes extracting a plurality of extracted image files from the at least one design file. The method further includes providing front-end code for the website that includes the HTML code, the CSS file, and the plurality of extracted image files to the client device.

17 Claims, 7 Drawing Sheets

AUTOMATED FRONT-END CODE GENERATING METHOD AND SYSTEM FOR A WEBSITE

TECHNICAL FIELD

The present disclosure generally relates to user experience and user interface design for a website. More specifically, the present disclosure generally relates to a method and system for generating automated front-end code for a website from design files.

BACKGROUND

Currently, the process of generating front-end code for a website is largely manual. A website often starts with a design prepared by a user experience (UX) developer. The design typically is provided using a design file that includes an image of the "look and feel" of the website. A user interface (UI) developer may use the design provided by the UX developer as an input for manually coding the front-end code for the website that interacts with web browsers. This process may include manual conversion or coding of hypertext markup language (HTML) code and cascading style sheet (CSS) files to build the front-end code. The front-end code may then be integrated with the back-end code that is used to host the website. Manual coding for website creation is error prone, time intensive, and can require a team of developers to create a website, such as a website for an ecommerce company.

SUMMARY

In one aspect, a method for generating automated front-end code for a website is provided, the method may comprise obtaining at least one design file associated with a design of a website, where the at least one design file comprises a plurality of layers; automatically generating hypertext markup language (HTML) code and a cascading style sheet (CSS) file from the at least one design file, with the HTML code and the CSS file being automatically generated based on information included in the plurality of layers; extracting a plurality of extracted image files from the at least one design file; and providing front-end code for the website comprising the HTML code, the CSS file, and the plurality of extracted image files to a client device.

In another aspect, one or more non-transitory computer readable storage media encoded with instructions are provided that, when executed by a processor of an automated front-end code generating system, causes the processor to obtain at least one design file associated with a design of a website; automatically generate hypertext markup language (HTML) code and a cascading style sheet (CSS) file from the at least one design file; extract a plurality of extracted image files from the at least one design file; and provide front-end code for the website comprising the HTML code, the CSS file, and the plurality of extracted image files to a client device.

In another aspect, a system for generating automated front-end code for a website is provided that can comprise at least one communication interface; a memory; and a processor in communication with the at least one communication interface and the memory, wherein the processor is configured to: obtain at least one design file associated with a design of a website; automatically generate hypertext markup language (HTML) code and a cascading style sheet (CSS) file from the at least one design file; extract a plurality of extracted image files from the at least one design file; and provide front-end code for the website comprising the HTML code, the CSS file, and the plurality of extracted image files to a client device.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

As described above, the current technique for generating front-end code for a website is a highly manual process. As a result, a number of challenges exist with this conventional process. For example, manual efforts to convert UX designs to front-end code result in long build times and quality issues arising from human error. These long build times can also delay the time it takes for a new website to come to market. Additionally, UI development is often dependent on the designers or business to provide the images and/or other content. There can also be coordination issues between the UX developers and the UI developers.

A method and system for generating automated front-end code for a website from design files is described herein to provide solutions to many of the challenges with the current techniques. The techniques of the present embodiments provide a faster delivery of front-end code for a website with high quality, error free, and computationally efficient executable code as compared to error prone code developed using conventional, manual development processes. The techniques described herein can also assist front-end developers and designers with working together to deliver work product to a customer or client faster than the conventional techniques. Accordingly, the techniques described herein can result in a reduction in time in the development cycle for a website, thereby increasing business revenue.

Figure 1:
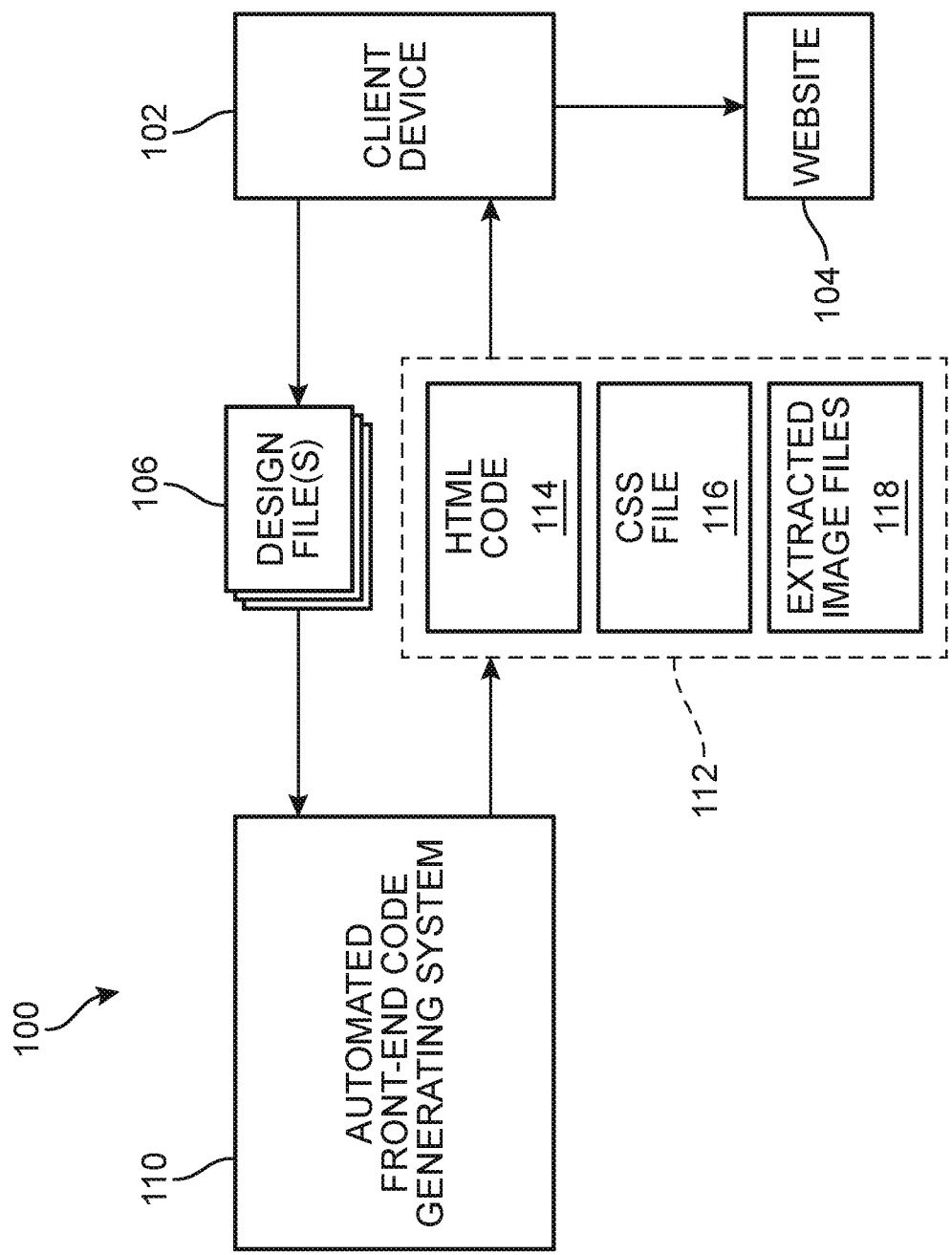
FIG. 1 is a block diagram of an example embodiment of an architecture for generating automated front-end code for a website.

Referring now to FIG. 1, an example embodiment of an architecture 100 for generating automated front-end code for a website is shown. In an example scenario, a client device 102, such as a computer or other device operated on behalf of a customer, client, or business, is associated with a website 104, such as an ecommerce website. Accordingly, in this scenario, client device 102 may receive a design for website 104 prepared by one or more UX developers or other parties as a mock-up of the look-and-feel of website 104. In an example embodiment, this design is provided as a design file 106. In some embodiments, design file 106 may include multiple design files, for example, associated with the look-and-feel of website 104 on different types of devices and/or displays.

In an example embodiment, design file 106 may be a layered image file, such as a .jpeg/.jpg file or a wireframe file, or may be a proprietary-type of layered image file, such as a Photoshop Document (.psd) file, as well as any other suitable format of a layered image file.

In this embodiment, design file 106 is provided by client device 102 to an automated front-end code generating system 110 (also referred to herein as "code generator 110"). As will be described in more detail below, automated front-end code generating system 110 includes a computer and/or processor configured to implement method(s) for generating automated front-end code for a website (e.g., website 104) described herein. In various embodiments, code generator 110 may be implemented in hardware, software, or a combination thereof. For example, code generator 110 may be embodied in a computer or other component having at least one processor or may be embodied as a computer-implemented program configured to execute on a computer or other component having at least one processor.

According to the techniques of the example embodiments, code generator 110 is configured to receive design file 106 for website 104 from client device 102 and automatically generate front-end code 112 for website 104. In this embodiment, front-end code 112 includes at least hypertext markup language (HTML) code 114 and a cascading style sheet (CSS) file 116 that has been automatically generated by code generator 110 from design file 106. Additionally, front-end code 112 for website 104 may also include a plurality of extracted image files 118 that have been extracted by code generator 110 from design file 106.

In contrast to the conventional manual methods of creating code for a website, which requires specific tools, the automated front-end code generating system (e.g., code generator 110) of the present embodiments can read the design files automatically without any additional tools to generate the front-end code for the website. Additionally, code generator 110 automatically extracts the images from the design files as extracted image files (e.g., extracted image files 118) and stores the files in a folder.

In an example embodiment, code generator 110 provides front-end code 112, including HTML code 114, CSS file 116, and extracted image files 118, to client device 102, which then uses front-end code 112 for website 104. For example, in some embodiments, front-end code 112, which is typically associated with the interaction of website 104 with web browsers, may be integrated with the back-end code for website 104, which is typically responsible for hosting and serving the content and other features of website 104.

Figure 2:
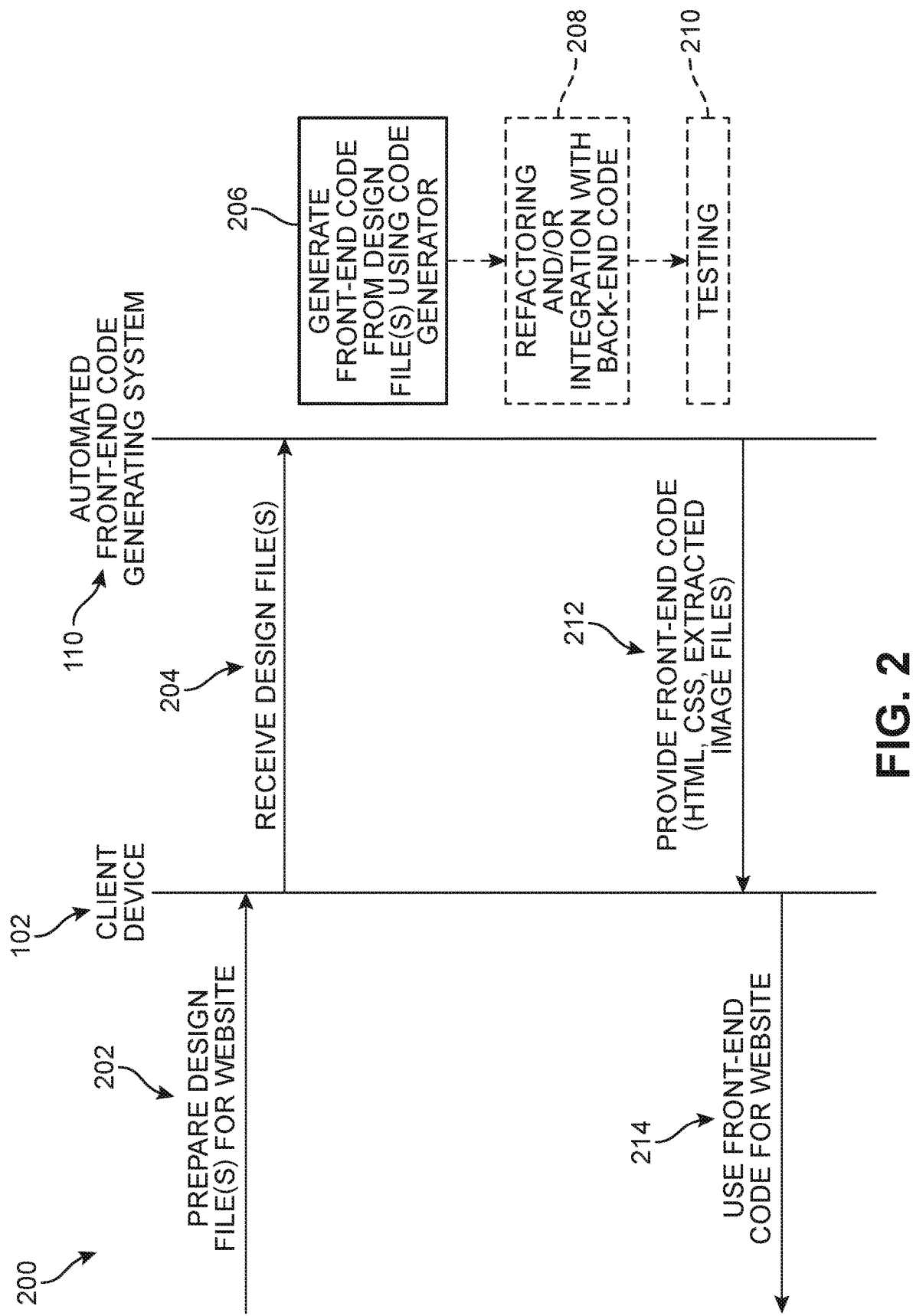
FIG. 2 is a ladder diagram of an example embodiment of a process for generating automated front-end code for a website.

Referring now to FIG. 2, a ladder diagram of an example embodiment of a process 200 for generating automated front-end code for a website is shown. In this embodiment, process 200 is implemented between client device 102, which may be operated on behalf of a customer, client, business, etc., and automated front-end code generating system 110 (i.e., code generator 110), which may be embodied in hardware, software, or a combination of hardware and software. In some embodiments, a vendor or third-party service provider may use code generator 110 as part of a service, for example, a hosted service, that provides front-end code for a website to client device 102.

In the embodiment of FIG. 2, process 200 begins with a step 202 of preparing one or more design files for a website. In some cases, step 202 may be performed, for example, by UX developers which generate a design file for website 104 that is provided to client device 102. Client device 102 begins process 200 with step 202 that includes obtaining or receiving the prepared design file(s) for a website (e.g., website 104). Next, at a step 204, code generator 110 receives the design file(s) from client device 102.

Once code generator 110 receives the design file(s), process 200 may include a number of additional steps. At a step 206, code generator 110 generates front-end code from the design file(s) received at step 204. Next, process 200 may also include optional steps that may be performed at automated front-end code generating system 110. For example, as shown in FIG. 2, upon completion of generating front-end code for the website at step 206, process 200 may optionally include a step 208. At optional step 208, the front-end code generated by code generator 110 may be refactored, for example, to restructure the generated front-end code without changing its external behavior so as to improve nonfunctional attributes of the code (e.g., clean up and organize the code). Optional step 208 may also include integration of the front-end code (e.g., generated at step 206) with back-end code for the website.

Additionally, in some embodiments, process 200 may further include an optional step 210. At optional step 210, the front-end code (e.g., as generated at step 206 or after refactoring and/or integration with the back-end code at step 208) may undergo testing. In some cases, the testing performed at optional step 210 may be implemented as part of a service that provides front-end code for a website to client device 102.

Once the front-end code for the website is generated by code generator 110 at step 206, or upon completion of additional optional step 208 and/or optional step 210, process 200 includes a step 212 of providing the front-end code to client device 102. In an example embodiment, the front-end code for the website provided to client device 102 at step 212 includes at least HTML code, a CSS file, and a plurality of extracted image files for the website. Upon receiving the front-end code from code generator 110, client device 102 may then use the front-end code at a step 214 for the website (i.e., the website for which the design file(s) were prepared at step 202).

Figure 3:
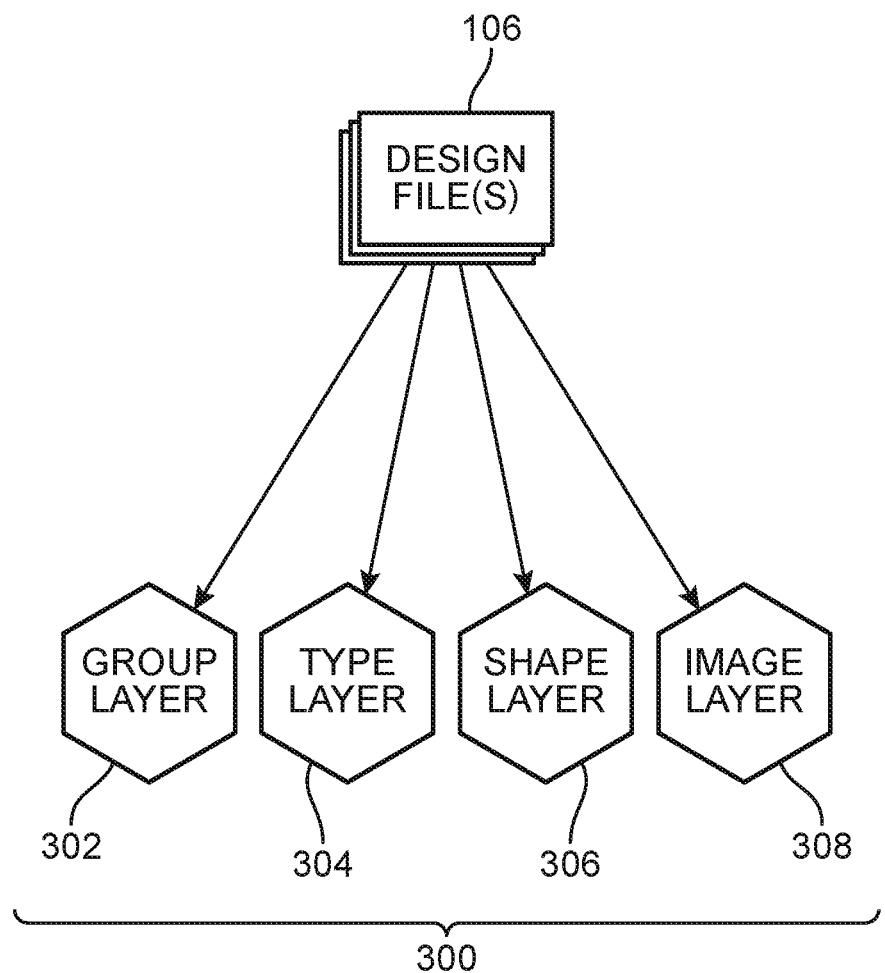
FIG. 3 is a schematic diagram of an example embodiment of a design file for a website.

FIG. 3 is a schematic diagram of an example embodiment of design file 106 for a website. In this embodiment, design file 106 is a representative design file for a website that may be used in accordance with techniques described herein to automatically generate front-end code. In an example embodiment, design file 106 may be any type or format of a layered image file. For example, as shown in FIG. 3, design file 106 is a layered image file that includes a plurality of layers 300. The layers of a layered image file can include the images, text, and/or objects that make up the layered file. This layered arrangement allows content, such as images, text, and/or objects, to be separately moved or edited on one layer without affecting the content on the other layers.

As shown in FIG. 3, plurality of layers 300 include a group layer 302, a type layer 304, a shape layer 306, and an image layer 308. Group layer 302 can include multiple layers that are grouped together. Type layer 304 can include type or text that may be edited, for example, to change character color, font type, font size, etc. Shape layer 306 can include different geometric and non-geometric shapes, including vector shapes, paths, and/or pixel-based shapes. Image layer 308 can include one or more images that may be arranged in various orders. In other embodiments, plurality of layers 300 may include a different number and/or different types of layers. As will be described below, code generator 110 is configured to extract information associated with each layer of plurality of layers 300 as part of generating the front-end code for the website.

Figure 4:
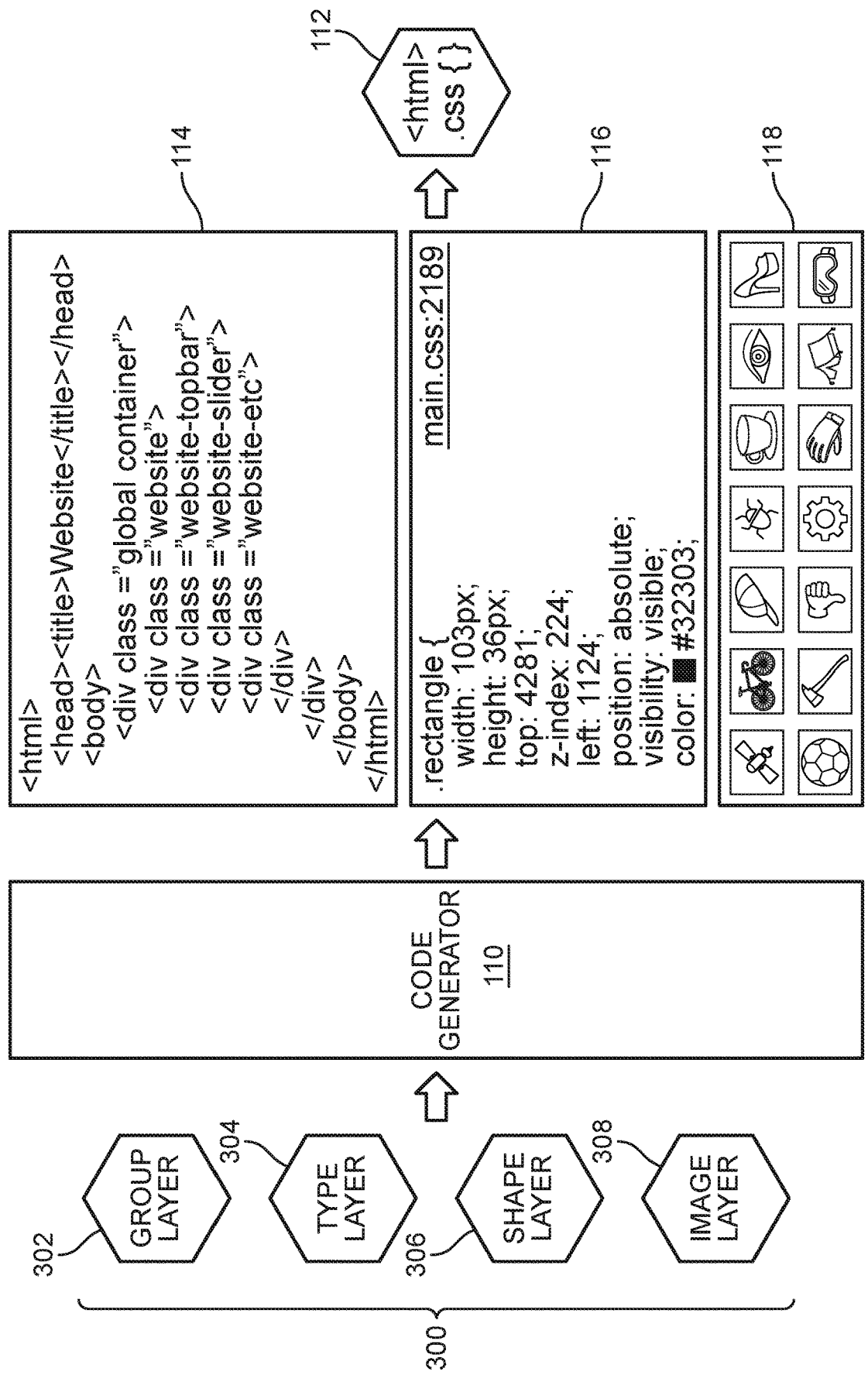
FIG. 4 is a schematic diagram of an example embodiment of a design file being used to automatically generate front-end code for a website.

FIG. 4 is a schematic diagram of an example embodiment of design file 106 being used to automatically generate front-end code 112 for a website. In this embodiment, design file 106 is a layered image file that includes plurality of layers 300, as shown in FIG. 3, including group layer 302, type layer 304, shape layer 306, and image layer 308. Using information included in plurality of layers 300, code generator 110 generates HTML code 114, CSS file 116, and extracted image files 118.

HTML code 114 includes standard markup language for documents designed to be displayed in a web browser. HTML code 114 generally provides the basic structure of website to a web browser for displaying text, loading images, and/or rendering the content of the website. HTML code 114 may be used together with CSS file 116 for a website. CSS file 116 is a plain text file format used for formatting the content on a website. CSS file 116 provides information that is used by the web browser to show the content in a proper display format. For example, CSS file 116 may include information regarding font, size, color, spacing (e.g., width and/or height), borders, and/or location of various information (e.g., text, images, other content, etc.) associated with HTML code 114 for a website.

Extracted image files 118 includes images, photos, icons, graphics, etc. that are extracted or clipped into individual image files from design file 106. In some embodiments, code generator 110 may automatically extract and save extracted image files into a folder. Extracted image files 118 are provided to client device 102 to use for the website and may be saved to a server or other database that hosts the website. Extracted image files 118 may later be updated, modified, replaced, changed, etc. by client device 102 for specific uses on the website. However, code generator 110 provides extracted image files 118 to client device 102 as a set of initial or default images that may be used to build or create the website.

In an example embodiment, code generator 110 may read each layer of plurality of layers 300 of design file 106 and use the properties and information associated with each layer to generate generates HTML code 114, CSS file 116, and extracted image files 118. For example, type layer 304 may be used to generate text and other content in HTML code 114 to be included on the website. Shape layer 306 may be used to generate different icons and graphics that are to be included on the website. Image layer 308 may be used to extract or slice extracted image files 118 that are to be used on the website. Additionally, various properties associated with each layer of plurality of layers 300 may be generated and combined in CSS file 116. With this arrangement, HTML code 114, CSS file 116, and extracted image files 118 may be provided together as front-end code 112 to client device 102 for the website associated with design file 106.

The automated front-end code generating system (e.g., code generator 110) of the present embodiments can automatically identify exact font family, colors, spaces between elements, etc. contained in the layers of the design files and convert this information into respective HTML tags included in the HTML code (e.g., HTML code 114). In contrast, the conventional manual process requires the design files to be manually read and understood by a developer using specific tools, such as Photoshop, and the information is manually translated into different color codes, padding, spacing, font family in the HTML code, which increases opportunities for manual errors in the code. With the techniques of the example embodiments, however, the conversion of HTML code from design files is automated, so that the information in the design files, such as font values, spacing, font family, etc., are directly read without any manual intervention which improves the quality of the resulting code and reduces defects during testing.

Figure 5:
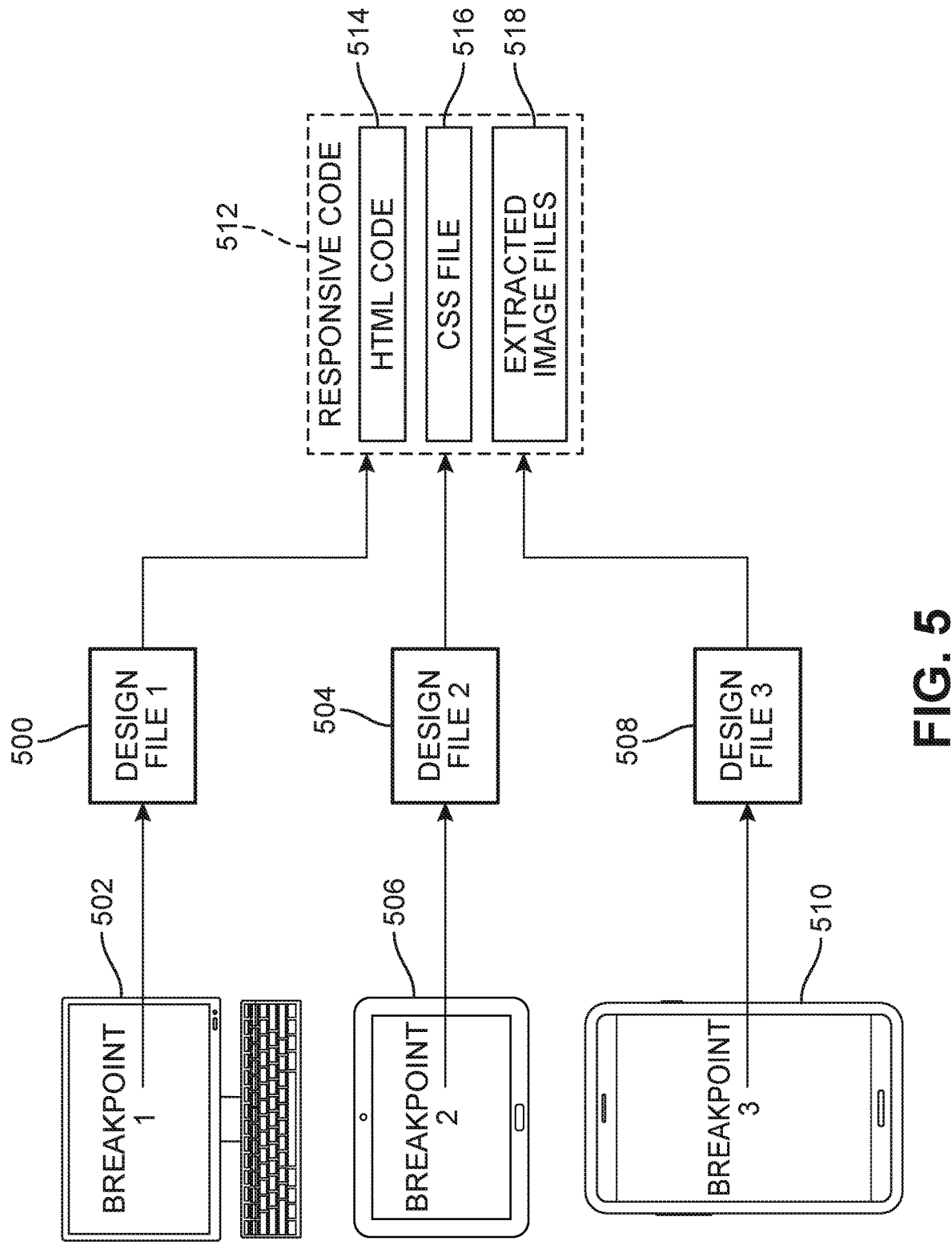
FIG. 5 is a schematic diagram of an example embodiment of responsive code generated based on multiple design files for a website.

In some embodiments, code generator 110 may generate responsive front-end code for a website that is configured for multiple different types of devices and/or displays. FIG. 5 is a schematic diagram of an example embodiment of responsive code generated based on multiple design files for a website. A website may be accessed from many different devices of different types, sizes, and/or displays. Accordingly, website designers seek to provide a user experience for a website that is similar across all of these different types of devices and/or displays. One way that the website may be configured to provide a consistent user experience is through different breakpoints. In general, a breakpoint is a point where the website content responds according to the device properties (e.g., display width or size) to provide the best possible layout to the website visitor. An example breakpoint is where the layout of a website may change from two columns to four columns based on the device used to interact with the website.

In an example embodiment, a plurality of design files may be prepared for the same website, where each design file is associated with a specific breakpoint configured for a particular type of device or display. For example, as shown in FIG. 5, a first design file 500 for a website may be associated with a first breakpoint for a first device 502. In this embodiment, first device 502 is a desktop or personal computer. Accordingly, first design file 500 is configured with breakpoints (e.g., breakpoint 1, shown in FIG. 5) associated with a layout of the website's content as it would appear on first device 502.

Similarly, a second design file 504 for the website (i.e., the same website associated with first design file 500) is associated with a second device 506. In this embodiment, second device 506 is a tablet computer. Accordingly, second design file 504 is configured with a second breakpoint associated with a layout of the website's content as it would appear on second device 506 (e.g., breakpoint 2, shown in FIG. 5). Because first device 502 and second device 506 have different display sizes, first design file 500 and second design file 504 are configured with different breakpoints. In addition, in this embodiment, the plurality of design files further includes a third design file 508 for the website (i.e., the same website associated with first design file 500 and second design file 504). Third design file 508 is associated with a third device 510, for example, a mobile or cellular phone in this embodiment. Third design file 508 is configured with a third breakpoint associated with a layout of the website's content as it would appear on third device 510 (e.g., breakpoint 3, shown in FIG. 5).

In this embodiment, each of first device 502, second device 506, and third device 510 are different types of devices and/or displays. As a result, each design file of the plurality of design files, including first design file 500, second design file 504, and third design file 508, includes different breakpoints that are specific to each type of device and/or display. According to the techniques of the embodiments described herein, code generator 110 is configured to generate responsive front-end code 512 for the website based on each design file of the plurality of design files. With this arrangement, responsive front-end code 512 may be configured automatically with the appropriate breakpoints for each type of device and/or display, thereby providing a consistent user experience for the website across multiple types of devices and/or displays.

For example, as shown in FIG. 5, responsive front-end code 512 includes HTML code 514 and CSS file 516 that are generated based on the plurality of design files, including first design file 500, second design file 504, and third design file 508. That is, HTML code and CSS file 516 combine the various breakpoints associated with each of first device 502, second device 506, and third device 510 included in first design file 500, second design file 504, and third design file 508 in a single responsive front-end code 512. Additionally, a plurality of default image files 518 are also generated by code generator 110 from the plurality of design files.

Using the techniques described herein, code generator 110 is configured to provide responsive code 512 for the website including HTML code 514, CSS file 516, and extracted image files 518 to client device 102. Responsive code 512 includes each breakpoint configured for a different type of device and/or display associated with each design file of the plurality of design files (i.e., first design file 500, second design file 504, and third design file 508). In this embodiment, responsive code 512 is configured for at least three different types of devices and/or displays, however, it should be understood that responsive code may be configured for any number of different types of devices and/or displays.

Figure 6:
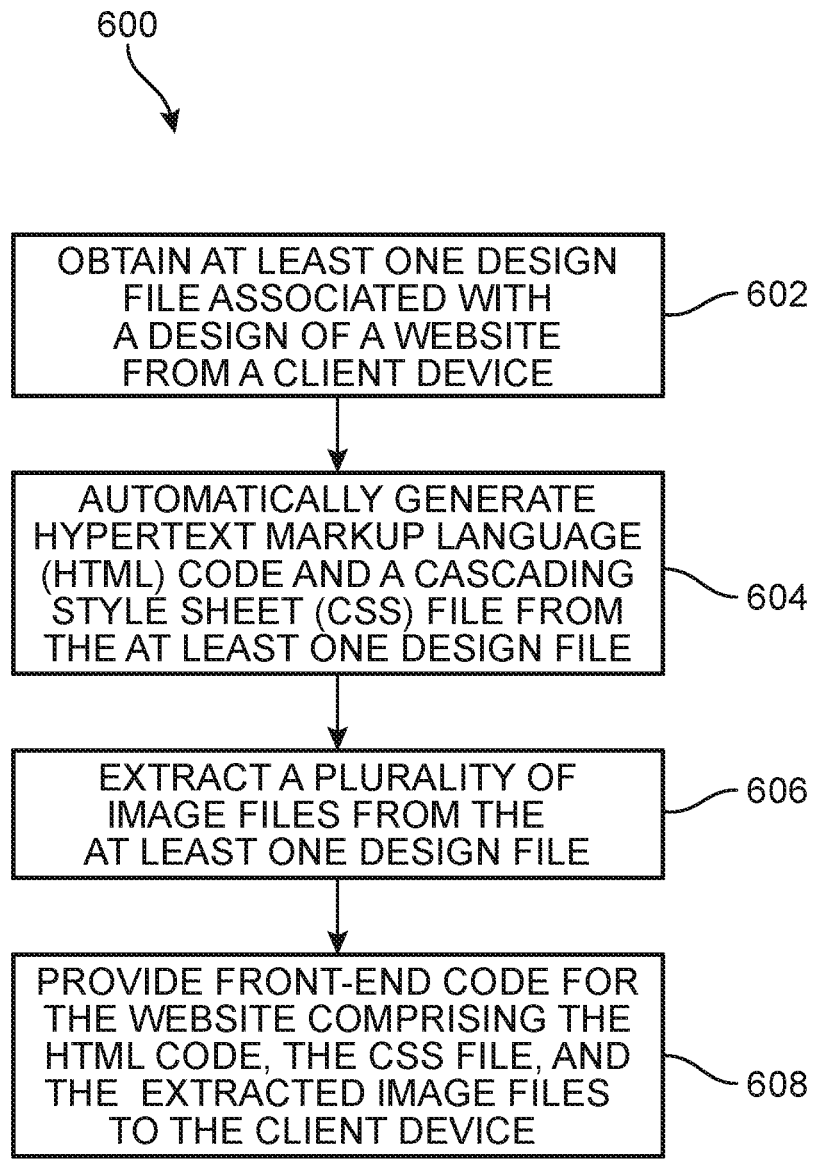
FIG. 6 is a flowchart of an example embodiment of a method for generating automated front-end code for a website.

FIG. 6 is a flowchart of an example embodiment of a method 600 for generating automated front-end code for a website. In some embodiments, method 600 may be implemented by a computer including a processor. For example, in an example embodiment, method 600 is implemented by code generator 110. In this embodiment, method 600 may begin with an operation 602. At operation 602, at least one design file associated with a design of a website is obtained from a user. For example, as described above, design file 106 for website 104 may be received by code generator 110 from client device 102.

Next, method 600 includes an operation 604. At operation 604, front-end code for the website, including HTML code and a CSS file, is automatically generated from the at least one design file obtained at operation 602. For example, as described above, front-end code 112 for website 104, including HTML code 114 and CSS file 116, is automatically generated by code generator 110 upon obtaining design file 106.

Method 600 further includes an operation 606 where a plurality of extracted image files are extracted from the at least one design file. For example, code generator 110 extracts extracted image files 118 from design file 106. Next, method 600 includes an operation 608. At operation 608, the front-end code for the website, including the HTML code, the CSS file, and the extracted image files, is provided to the user. For example, code generator 110 provides front-end code 112, including HTML code 114, CSS file 116, and extracted image files 118, to client device 102 for website 104, as described above with reference to FIG. 1.

In some embodiments, method 600 may include additional or optional operations. For example, in embodiments where code generator 110 generates responsive code (e.g., responsive front-end code 512), operation 602 may include obtaining multiple design files. Additionally, as described above in reference to FIG. 2, method 600 may also include refactoring of the front-end code and/or integration of the front-end code with the back-end code for the website. In still other embodiments, method 600 may also include testing of the front-end code and/or integrated code for errors and/or functionality before providing the code to the client device.

Figure 7:
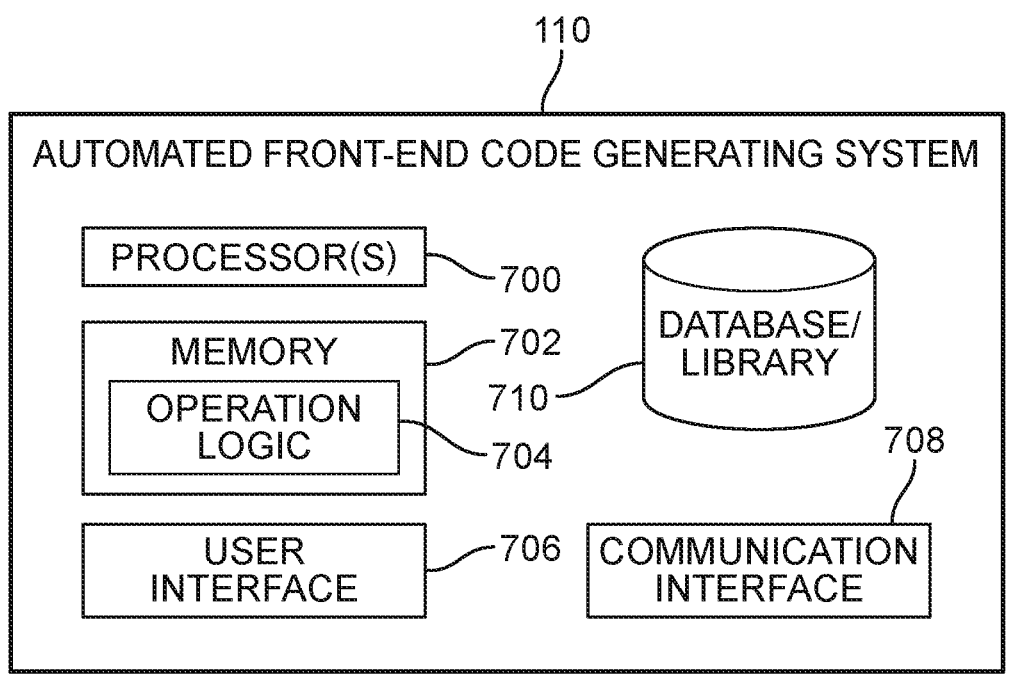
FIG. 7 is a block diagram of a computer-implemented system for generating automated front-end code for a website.

Referring now to FIG. 7, a block diagram of a computer-implemented system for generating automated front-end code for a website is shown. In an example embodiment, the computer-implemented system may be code generator 110.

In an example embodiment, code generator 110 includes a processor 700 that is configured to implement the techniques for generating automated front-end code for a website described herein. For example, processor 700 of code generator 110 may execute instructions from a computer readable storage medium to implement the method of the present embodiments. Processor 700 may be associated with a personal computer and/or a server, as well any type of computing device. For example, in some embodiments, code generator 110 may be a remote server, a cloud platform, or a client-side personal computer. It should be appreciated that FIG. 7 provides only an illustration of one implementation and does not imply any limitations with regard to the environments in which different embodiments may be implemented. Many modifications to the depicted environment may be made.

As shown in FIG. 7, code generator 110 includes a memory 702, a user interface 706, a communication interface 708, and a database or library 710. A communications fabric (not shown) may also be provided for communications between processor(s) 700, memory 702, user interface 706, communication interface 708, and database 710. The communications fabric can be implemented with any architecture designed for passing data and/or control information between processors (such as microprocessors, communications and network processors, etc.), system memory, peripheral devices, and any other hardware components within a system. For example, the communications fabric may be implemented with one or more buses.

Memory 702 and database/library 710 are computer-readable storage media. In some embodiments, memory 702 may include a random access memory (RAM) and a cache memory. In general, memory 702 can include any suitable volatile or non-volatile computer-readable storage media. One or more programs may be stored in database 710 for access and/or execution by one or more of the respective processors 700 via one or more memories of memory 702. In an example embodiment, memory 702 may include operation logic 704 that is configured to implement the steps and operations of the method and process for generating automated front-end code for a website described herein. For example, operation logic 704 may be configured to implement one or more steps of process 200 associated with code generator 110, as well as one or more operations of method 600, described above.

In various embodiments, database/library 710 may include a magnetic hard disk drive, and, alternatively, or in addition to a magnetic hard disk drive, database/library 710 can include a solid state hard drive, a semiconductor storage device, read-only memory (ROM), erasable programmable read-only memory (EPROM), flash memory, or any other computer-readable storage media that is capable of storing program instructions or digital information.

The media used by database/library 710 may also be removable. For example, a removable hard drive may be used for database/library 710. Other examples include optical and magnetic disks, thumb drives, and smart cards that are inserted into a drive for transfer onto another computer-readable storage medium that is also part of database/library 710.

Communication interface 708 allows for communications with other processors, data processing systems, or devices. In an example embodiment, communication interface 708 may include one or more network interface cards. Communication interface 708 may provide communications through the use of either or both physical and wireless communications links.

User interface 706 allows for input and output of data with other devices that may be connected to code generator 110. For example, user interface 706 may provide a connection to external devices, such as a keyboard, keypad, a touch screen, an assistive or adaptive technology device, and/or some other suitable input device. External devices can also include portable computer-readable storage media such as, for example, thumb drives, portable optical or magnetic disks, and memory cards. Software and data used to practice the example embodiments may be stored on such portable computer-readable storage media and can be loaded onto database/library 710 via user interface 706. User interface 706 may also connect to a display. The display provides a mechanism to display data to a user and may be, for example, a computer monitor.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method implemented by an automated front-end code generating system for generating automated front-end code for a website, the method comprising:

obtaining, from a client device separate from the automated front-end code generating system, a plurality of design files for a single design of a website, wherein each design file of the plurality of design files comprises a plurality of layers, including a shape layer, a type layer, and an image layer, and corresponds to a different breakpoint each configured for a different type of device and/or display, wherein each breakpoint corresponds with a layout of the website's content on a specific type of device and/or display;

in response to obtaining the plurality of design files as input to the automated front-end code generating system, using the image layer to automatically extract a plurality of extracted image files from the plurality of design files and to automatically clip the plurality of extracted image files into individual image files from the same plurality of design files, and saving the clipped individual image files;

in response to obtaining the plurality of design files as input to the automated front-end code generating system, automatically identifying font families, colors, and spaces between elements contained in each of the plurality of layers; and in response to obtaining the plurality of design files as input to the automated front-end code generating system, automatically generating responsive code comprising a single package of front-end code for the website based on the obtained plurality of design files, the front-end code comprising hypertext markup language (HTML) code, a cascading style sheet (CSS) file, and the plurality of extracted image files, and wherein the HTML and CSS file combine each of the different breakpoints in the single package of front-end code, and wherein generating responsive code includes automatically converting the identified font families, colors, and spaces between elements into corresponding HTML tags in the generated HTML code, wherein the single package of front-end code causes the generation of icons and/or graphics on the website based on the shape layer, causes the generation of text on the website based on the type layer, and causes the clipped individual image files to be displayed on the website, wherein automatically generating responsive code further includes automatically generating responsive code without additional customization on top of the generated code.

2. The method of claim 1, wherein the plurality of layers includes a group layer including multiple layers that are grouped together.

3. The method of claim 1, further comprising providing the single package of front-end code for the website to the client device.

4. The method of claim 1, further comprising refactoring the HTML code and CSS file prior to providing the single package of front-end code for the website to the client device.

5. The method of claim 1, further comprising integrating the single package of front-end code with back-end code for the website.

6. The method of claim 1, wherein at least one breakpoint corresponds with a layout of the website's content on a mobile phone and at least one breakpoint corresponds with a layout of the website's content on a tablet computer.

7. One or more non-transitory computer readable storage media encoded with instructions that, when executed by a processor of an automated front-end code generating system, causes the processor to:

obtain, from a client device separate from the automated front-end code generating system, a plurality of design files for a single design of a website, wherein each design file of the plurality of design files comprises a plurality of layers, including a shape layer, a type layer, and an image layer, and corresponds to a different breakpoint each configured for a different type of device and/or display, wherein each breakpoint corresponds with a layout of the website's content on a specific type of device and/or display;

in response to obtaining the plurality of design files as input to the automated front-end code generating system, using the image layer to automatically extract a plurality of extracted image files from the plurality of design files and to automatically clip the plurality of extracted image files into individual image files from the same plurality of design files, and saving the clipped individual image files;

in response to obtaining the plurality of design files as input to the automated front-end code generating system, automatically identify font families, colors, and spaces between elements contained in each of the plurality of layers; and in response to obtaining the plurality of design files as input to the automated front-end code generating system, automatically generate responsive code comprising a single package of front-end code for the website based on the obtained plurality of design files, the front-end code comprising hypertext markup language (HTML) code, a cascading style sheet (CSS) file, and the plurality of extracted image files, and wherein the HTML and CSS file combine each of the different breakpoints in the single package of front-end code, and wherein generating responsive code includes automatically converting the identified font families, colors, and spaces between elements into corresponding HTML tags in the generated HTML code, wherein the single package of front-end code causes the generation of icons and/or graphics on the website based on the shape layer, causes the generation of text on the website based on the type layer, and causes the clipped individual image files to be displayed on the website, wherein automatically generating responsive code further includes automatically generating responsive code without additional customization on top of the generated code.

8. The one or more non-transitory computer readable storage media of claim 7, wherein the shape layer includes different geometric and non-geometric shapes, including vector shapes, paths, and/or pixel-based shapes.

9. The one or more non-transitory computer readable storage media of claim 8, wherein the plurality of layers includes a group layer including multiple layers that are grouped together.

10. The one or more non-transitory computer readable storage media of claim 9, wherein the shape layer includes different geometric and non-geometric shapes, including vector shapes, paths, and/or pixel-based shapes.

11. The one or more non-transitory computer readable storage media of claim 7, further comprising refactoring the HTML code and CSS file prior to providing the single package of front-end code for the website to the client device.

12. The one or more non-transitory computer readable storage media of claim 7, wherein at least one breakpoint corresponds with a layout of the website's content on a mobile phone and at least one breakpoint corresponds with a layout of the website's content on a tablet computer.

13. A system for generating automated front-end code for a website, the system comprising:
  at least one communication interface;
  a memory; and
  a processor in communication with the at least one communication interface and the memory, wherein the processor is configured to:
    obtain, from a client device separate from the automated front-end code generating system, a plurality of design files for a single design of a website, wherein each design file of the plurality of design files comprises a plurality of layers, including a shape layer, a type layer, and an image layer, and corresponds to a different breakpoint each configured for a different type of device and/or display, wherein each breakpoint corresponds with a layout of the website's content on a specific type of device and/or display;

in response to obtaining the plurality of design files as input to the automated front-end code generating system, use the image layer to automatically extract a plurality of extracted image files from the plurality of design files and to automatically clip the plurality of extracted image files into individual image files from the same plurality of design files, and save the clipped individual image files;

in response to obtaining the plurality of design files as input to the automated front-end code generating system, automatically identify font families, colors, and spaces between elements contained in each of the plurality of layers; and in response to obtaining the plurality of design files as input to the automated front-end code generating system, automatically generate responsive code comprising a single package of front-end code for the website based on the obtained plurality of design files, the front-end code comprising hypertext markup language (HTML) code, a cascading style sheet (CSS) file, and the plurality of extracted image files, and wherein the HTML and CSS file combine each of the different breakpoints in the single package of front-end code, and wherein generating responsive code includes automatically converting the identified font families, colors, and spaces between elements into corresponding HTML tags in the generated HTML code, wherein the single package of front-end code causes the generation of icons and/or graphics on the website based on the shape layer, causes the generation of text on the website based on the type layer, and causes the clipped individual image files to be displayed on the website, wherein automatically generating responsive code further includes automatically generating responsive code without additional customization on top of the generated code.

14. The system of claim 13, wherein the plurality of layers includes a group layer including multiple layers that are grouped together.

15. The system of claim 13, further comprising providing the single package of front-end code for the website to the client device.

16. The system of claim 15, further comprising refactoring the HTML code and CSS file prior to providing the single package of front-end code for the website to the client device.

17. The system of claim 13, wherein at least one breakpoint corresponds with a layout of the website's content on a mobile phone and at least one breakpoint corresponds with a layout of the website's content on a tablet computer.

* * * * *